United States Patent

[11] 3,585,606

[72] Inventors James R. Evans
Edicott;
John W. Roossien, Binghamton, both of, N.Y.
[21] Appl. No. 857,398
[22] Filed Sept. 12, 1969
[45] Patented June 15, 1971
[73] Assignee International Business Machines Corporation
Armonk, N.Y.

[54] FILE PROTECT CIRCUIT AND METHOD
8 Claims, 2 Drawing Figs.

[52] U.S. Cl. ........ 340/172.5
[51] Int. Cl. ........ G06f 1/00
[50] Field of Search ........ 340/172.5

[56] References Cited

UNITED STATES PATENTS

| | | | |
|---|---|---|---|
| 3,263,218 | 7/1966 | Anderson | 340/172.5 |
| 3,340,539 | 9/1967 | Sims, Jr. | 340/172.5 |
| 3,368,207 | 2/1968 | Beausoleil et al. | 340/172.5 |
| 3,473,159 | 10/1969 | Cantrell et al. | 340/172.5 |

*Primary Examiner*—Raulfe B. Zache
*Attorney*—Hanifin and Jancin

ABSTRACT: A file protection circuit for disc storage control units prevents unauthorized users from obtaining information from a bulk disc storage unit. Each transfer from the sequentially addressable buffer within the storage control unit is monitored so as to determine whether the data sought from the sequentially addressable buffer is from a protected field. Upon determining that the data is from a protected field, the data transfer from the sequentially addressable buffer to the main memory of the data processor is prevented. The subsequent data transfers are counted by a counting mechanism so as to prevent the transfer of a predetermined number of bytes or characters. When the counting means reaches a predetermined value, the blocking mechanism is inhibited and further transfers from the sequentially addressable buffer to the main memory are allowed.

INVENTORS
JAMES R. EVANS
JOHN W. ROOSSIEN
BY John D. Crane
AGENT

FILE PROTECT CIRCUIT AND METHOD

BACKGROUND OF THE INVENTION

This invention relates to a data processing system disc storage control unit wherein certain records contained in the disc file can be protected from unauthorized use.

For many users of data processing systems, the problem of data security within the various information storage devices is an important one. Typically, computer users will have highly proprietary information stored within the various data storage devices used within the system. Such proprietary information might be cost data, customer lists, employee's skills information, and any other information deemed proprietary by corporate management. Because such information is deemed proprietary, it is highly desirable that the availability of such information be restricted to the class of users who are authorized to receive such information.

In typical data processing systems, there are various types of file protect features available to insure the security of proprietary information. The availability of file protect features, however, has been limited to certain types of storage devices which include magnetic core storage units and magnetic tape storage units.

In recent years, the magnetic disc storage device has become popular with computer users because of its large storage capacity and relatively high access speed. W. F. Beausoleil et al. in their U.S. Pat. No. 3,368,207 have shown a typical disc storage control unit with a file protect circuit. Their circuit, however, lacks the flexibility of the present invention because it cannot protect single words from being fetched because the protect boundaries they have established are cylinder boundaries. Thus, large portions of storage can be protected, but there is no way of preventing unauthorized access of only one word.

Therefore, it is a primary object of this invention to describe a storage protect feature which will provide the data security desired to prevent unauthorized use of the proprietary information stored therein but allow complete availability of all other information stored in a disc storage unit.

An additional object of this invention is to provide a file protect feature for a disc file control unit capable of preventing unauthorized access to data fields having a length as small as one byte.

It is a further object of this invention to provide a storage protect feature for a disc control unit which has a minimal effect upon the speed of operation as well as providing maximum protection at minimum cost.

It is a still further object of this invention to provide a storage protect feature which can be installed in existing disc file control units without the requirement of major control circuit revision.

These and other objects, features, and advantages are realized in the preferred embodiment of this invention by modifying the circuitry of existing disc storage control units described by J. R. Evans in U.S. Pat. No. 3,348,213 which is assigned to the same assignee as the instant application. The modification, according to the preferred embodiment, includes the establishment of a preferential storage region within the buffer storage unit of the disc storage control unit. This preferential storage region is used to hold information received from the main memory under control of the central processing unit. This information relates to the starting address within a given record which is a protected address for the given user. Associated with the starting address is a count field which represents the number of characters in a field within the record beginning at the starting address which is protected. In a normal read operation, data is transferred from the bulk disc storage unit to the buffer storage unit and subsequently from the buffer to main memory. However, when the address being interrogated in the buffer becomes the same as that of the starting address of the protected data, the data transmission between the buffer and the main memory is suppressed. For each data transmission which is suppressed, the count field associated with the protected record is decremented until the count field reaches a value of zero. A zero count field condition indicates that the address of the buffer within the disc storage control unit has been incremented beyond the point where a protected data field is found and subsequent data transfers are not inhibited.

The foregoing and other objects, features, and advantages of the invention will be apparent from the following more particular description of the preferred embodiment of the invention, as illustrated in the accompanying drawings.

IN THE DRAWINGS

FIG. 1 is a block diagram of a control unit embodying the file protect feature of the instant invention.

FIG. 2 shows a flow chart of the necessary decisions made by the electronic circuitry of the subject invention.

BRIEF DESCRIPTION OF THE DRAWINGS

FIG. 1 shows essentially the same control unit as is shown in FIG. 3 of U.S. Pat. No. 3,348,213, which has the same assignee as this application. The basic operation of the control unit as therein described will not be further described here except where the operation is altered by the new elements which comprise the storage protect circuitry. The new elements in FIG. 1 can be identified as having identification numbers of 100 or greater.

GENERAL DESCRIPTION

Figure 1:
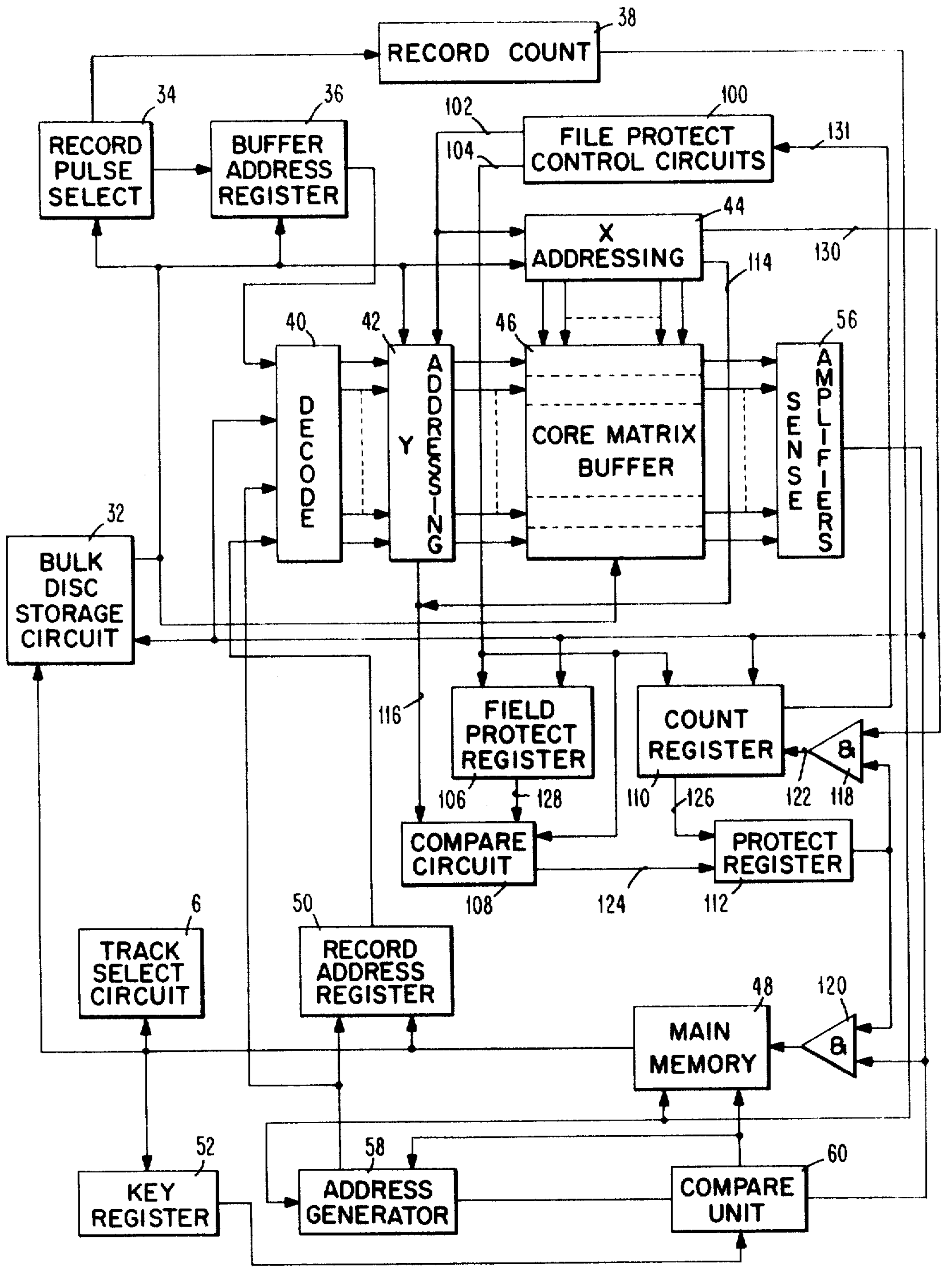
FIG. 1 shows a block diagram of a disc file storage control unit wherein the storage protect feature of this invention has been added. Specifically.
Figure 2:
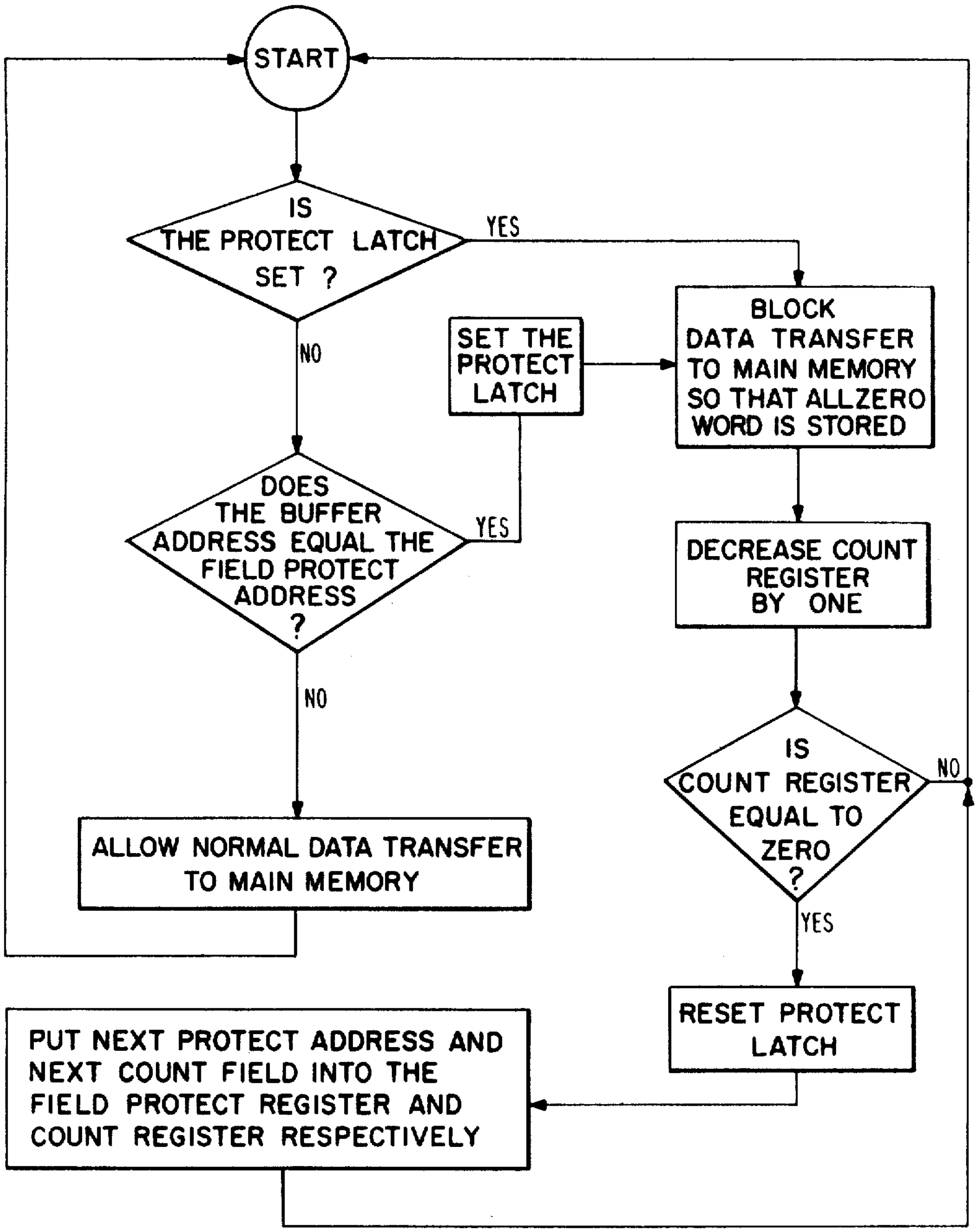
FIG. 2 shows in flow chart format the required decisions that must be made by the control and sensing circuits of the file protect circuit as herein described so as to successfully effectuate the desired read protection of the various records in the disc file. For each data transfer operation between the buffer or core matrix 46 and main memory 48, the electronic circuits of the file protect circuit can be considered to perform the operations shown in FIG. 2 beginning at the position labeled start. The functions which are performed for each data transfer are those that follow the position marked start and precede the line returning to the start position as shown in FIG. 2.

A block diagram of the electronic circuitry required to perform the functions shown in the flow chart of FIG. 2 is found in FIG. 1. The overall control required for the various operations performed comes from the file protect control circuits 100 which can be a series of counting circuits and registers or a type of read only storage control as is typically found in present day computer systems. The file protect control circuits 100 control the operation of the various special purpose registers so as to insure that accesses to protected areas are prevented.

The file protect control circuits 100 also control the X-addressing 44 and Y-addressing 42 over line 102 when file protect information is required from core matrix buffer 46.

A field protect register 106 is a standard hardware register and provides for the storing of starting addresses of protected fields. The field protect register 106 is connected to the sense amplifiers while data is allowed to be entered into field protect register 106 under control of the file protect circuits 100, the control signals being sent over line 104.

A compare circuit 108 can be any of many well-known circuits for comparing binary numbers. It compares the address in field protect register 106 which is sent over line 128 and the address of the core matrix buffer 46. The latter address comes from X-addressing 44 and Y-addressing 42 over line 116 and 114. When the address of core matrix buffer 46 is equal to the address of field protect register 106, a compare equal signal is generated and put on line 124.

The protect register 112 can be an ordinary flip-flop with line 124 being connected to the set input. The output of the protect register 112 is connected to two AND gates. AND gate 120 is in the data transmission line between the core matrix buffer 46 and main memory 48. When the protect register 112 is set, AND 120 is prevented from passing data.

X-addressing 44 is an incrementing address register and each time it is incremented, an increment signal is sent via line 130 to AND gate 118. When protect register 112 is ON, AND 118 is conditioned such that the increment signal from X-addressing 44 is gated to line 122.

A count register 110 is provided which receives data from the sense amplifiers 56 under the control of file protect circuits 100, the control signals being sent via line 104. Count register 110 is a decrementing register capable of reducing the binary number stored therein by one upon the receipt of a decrement signal. The decrement signal is received via line 122 from AND gate 118 and represents the coincidence of an increment signal from X-addressing 44 and the protect register 112 being in the ON state.

Count register 110 also operates to detect an all zero condition. When the count register 110 is decremented to zero, a count zero signal is generated by zero detect circuitry. The count zero signal is transmitted over line 126 to the reset input of the flip-flop which comprises protect register 112. The count zero signal is also sent via line 131 to the file protect circuits 100 for purposes to be described later.

OPERATION OF THE INVENTION

Initially, let us assume that an address has been stored in the field protect register 106 and an associated count has been stored in the count register 110. The address stored in the field protect register 106 represents the starting address of a field within core matrix 46 which is to be protected. In other words, by protection it is meant that the transfer of data from core matrix 46 is inhibited for characters which fall within a protected field in a record. The count stored in the count register represents the number of contiguous characters stored in core matrix 46 and starting at the address which is stored in the field protect register 106 which are to be protected against unauthorized fetching.

For each attempted data transfer between core matrix 46 and main memory 48, the address in the X-addressing 44 and the address in Y-addressing 42 is placed upon lines 114 and 116 to become an input to compare circuit 108. The second input is the address contained within field protect register 106 which is transmitted to the compare circuit 108 via line 128. The compare circuit 108 operates to determine whether the address of the core matrix as contained within X-addressing 44 and Y-addressing 42 is the same as the address within the field protect register 106. This comparing function could be performed by a series of Exclusive-OR circuits which are connected so as to compare all bit positions of the field protect register 106 and the address in X-addressing 44 and Y-addressing 42.

When the address of the character in core matrix 46 being selected for transfer to main memory is equal to the address in field protect register 106, a signal is sent from the compare circuit 108 over line 124 to set protect register 112 in the ON condition. When the protect register 112 in ON, this condition indicates that data transfers between core matrix 46 and main memory 48 should be inhibited.

The inhibiting of the data transfer is performed by gate 120 which has an input from the protect register as well as a second input from the sense amplifiers 56. Whenever the protect register is ON, gate 120 operates so as to prevent data transfers from the sense amplifiers 56 to the main memory 48.

In normal operation, the disc control unit as shown in FIG. 1 sequentially reads data from the bulk disc storage circuit 32 to the core matrix 46 and then transmits the sequentially read data from the core matrix 46 to main memory 48. As described more fully in the abovesaid Evans patent, each record in a disc track is stored in one horizontal row of the core matrix 46 and each address position in a horizontal row is assigned to one byte of data. Thus, X-addressing 44 is an addressing ring and generates a signal each time the address in X-addressing 44 is incremented. Y-addressing is also an incrementing address register although it increments each time X-addressing 44 overflows. The incrementing signal is transmitted over line 130 to AND gate 118. When the protect register 112 is in the ON condition, AND gate 118 will output a signal over line 122 each time X-addressing 44 is incremented. A signal on line 122 is the signal used to decrement count register 110. Thus, each time the address of core matrix 46 is incremented while the protect register 112 is set ON, the count register 110 will be decremented by one.

When the count register reaches a value of zero, a signal is sent over line 126 which resets the protect register 112. The resetting of the protect register 112 consequently allows subsequent gating of data from core matrix 46 to main memory 48 and to inhibit further decrementing of the count register 110.

Upon the counting down of the count register 110 to a value of zero, a signal is transmitted over line 131 to file protect control circuits 100. The purpose of this signal is to indicate that a new field protect address and associated count must be loaded into field protect register 106 and count register 110. The required information is stored in a preferential storage area within core matrix 46. In order to fetch this information, file protect control circuits 100 generate an address which is transmitted over line 102 to X-addressing 44 and Y-addressing 42. The file protect control circuits 100 fetches a field protect address and loads the address into the field protect register 106. The file protect control circuits 100 also fetches an associated count from core matrix 46 and loads it into the count register 110. The required gating signals for loading the field protect register 106 and the count register 110 are transmitted over line 104. Thus, upon the disc control unit having cycled through a given protected field of a record in core matrix 46, the protect circuitry fetches additional information which defines the next sequential field within the record which is to be protected. This capability allows the system to prevent unauthorized accessing of record fields containing as little as one word, and furthermore, protects record fields which are not necessarily contiguous with one another.

The information stored within the preferential region of core matrix 46 is loaded by circuitry not shown in FIG. 1. Typically, this circuitry is under control of the supervisor program within the CPU which is operating in conjunction with the disc file control unit. The supervisor program determines the areas within the disc file which are to be protected according to certain criteria available to the supervisor program. Upon every initialization which is designed to cause the disc file control unit to initiate a read operation, the supervisor transmits protect addresses and associated count fields to the disc file control unit which in turn stores this information in a preferential region within core matrix 46. The desired record or records are then transferred from the disc storage circuit 32 to predetermined consecutive locations in the buffer 46. Upon the starting of the transfer from buffer to main memory operation, file protect control circuits 100 causes the first protected address and its associated count field to be loaded into the file protect register 106 and count register 110 respectively. Upon the completion of the initialization process, the storage protect circuits are in a status to prevent the transfer of data from numerous data fields stored in the control unit buffer to the main storage unit associated with the data processor within the system.

While the invention has been particularly shown and described with reference to a preferred embodiment thereof, it will be understood by those skilled in the art that various changes in form and details may be made therein without departing from the spirit and scope of the invention.

What we claim is:

1. In combination with a data processor operating in response to a stored program, a random access storage control unit having a sequentially addressable buffer containing an incrementing address register and having transmission means connected to said buffer for effecting data transfers from the buffer to the processor, a file protection circuit comprising:

a detecting means for detecting when said incrementing address register reaches a predetermined value and for producing a compare equal signal when said incrementing address register reaches said predetermined value;

blocking means coupled to the transmission means and responsive to said compare equal signal so as to prevent data transfers form said sequentially addressable buffer to said data processor; and counting means for counting the number of blocked data transfers and for producing a stop blocking signal upon reaching a predetermined value, said stop blocking signal being sent to said blocking means to prevent further blocking of subsequent data transfers between said sequentially addressable buffer and said data processor.

2. The combination of claim 1 additionally comprising, a control means responsive to said stop blocking signal for fetching from said sequentially addressable buffer additional predetermined values for said incrementing address register and said counting means.

3. In combination with a data processor operating in response to a storage program and random access storage control unit having a sequentially addressable buffer containing an incrementing address register and having transmission means connected to said buffer for effecting data transfers from the buffer to the processor, a file protection circuit comprising:

a storage register for storing addresses of protected data, said protected data being stored within said sequentially addressable buffer;

a comparison circuit connected to said storage register and also connected to said incrementing address register of said sequentially addressable buffer for generating a compare equal signal indicating when the address in said storage register is the same as the address in said incrementing address register;

a protect register responsive to said compare equal signal, said protect register being in the ON state is response to said compare equal signal;

a blocking means responsive to said protect register being in the ON state so as to prevent data transfers from said sequentially addressable buffer to said data processor; and counting means for counting the number of blocked data transfers, said counting means producing a stop block signal to turn said protect register to the OFF state upon reaching a predetermined value whereby subsequent data transfers between said sequentially addressable buffer and said data processor are allowed.

4. The combination of claim 3 additionally comprising a control means responsive to said stop block signal to fetch from said sequentially addressable buffer an additional address of protected data and storing said address of protected data in said storage register and said control means also operative to fetch an additional predetermined value from said sequentially addressable buffer.

5. In combination with the data processor operating in response to a stored program and a random access storage control unit having a sequentially addressable buffer containing an incrementing address register and having transmission means connected to said buffer for effecting data transfers from the buffer to the processor, a file protection circuit comprising:

a storage register for storing addresses of protected data, said protected data being stored within said sequentially addressable buffer;

a comparison circuit connected to said storage register and also connected to said incrementing address register of said sequentially addressable buffer for generating a compare equal signal indicating when the address in said storage register is the same as the address in said incrementing address register;

a protect register responsive to said compare equal signal, said protect register being in the ON state in response to said compare equal signal;

a blocking means responsive to said protect register being in the ON state so as to prevent data transfers from said sequentially addressable buffer to said data processor; and a decrementing count register for storing count data associated with addresses of protected data, said decrementing count register operative to reduce the data stored therein by one whenever said protect register is in the ON state and said incrementing address register is incremented, said decrementing count register producing a count zero signal indicating that the data stored therein has been decremented to zero, said count zero signal operative to put said protect register in the OFF state whereby data transfers from said sequentially addressable buffer to said data processor are prevented only when the protect register is in the ON state.

6. The combination of claim 5 additionally comprising a control means responsive to said count zero signal to fetch from said sequentially addressable buffer an additional address of protected data and storing said address of protected data in said storage register and to fetch from said sequentially addressable buffer count data and storing said count data in said decrementing count register.

7. A method of protecting data fields from being transferred between a sequentially addressable buffer in a storage control unit and a data processor comprising the steps of:

1. detecting when the address of the sequentially addressable buffer is a protected address;
2. blocking data transfers from the sequentially addressable buffer to the data processor when a protected address is detected;
3. counting attempted data transfers until the number of attempts equals a predetermined value; and
4. allowing data transfers to occur after the predetermined number of attempts have occurred.

8. The method of claim 7 additionally comprising the step of:

5. repeating the above steps using a new protected address and predetermined count.